(12) United States Patent
Muniz

(10) Patent No.: US 9,279,534 B2
(45) Date of Patent: Mar. 8, 2016

(54) MODULAR FRAME SYSTEM FOR PRESSURE VESSELS USED IN WATER TREATMENT SYSTEMS

(71) Applicant: Flexi Adapt, Inc., Plantation, FL (US)

(72) Inventor: Sonia N. Muniz, Plantation, FL (US)

(73) Assignee: Flexi Adapt, Inc., Plantation, FL (US)

( * ) Notice: Subject to any disclaimer, the term of this patent is extended or adjusted under 35 U.S.C. 154(b) by 0 days.

(21) Appl. No.: 14/440,668

(22) PCT Filed: Nov. 6, 2013

(86) PCT No.: PCT/US2013/068644
§ 371 (c)(1),
(2) Date: May 5, 2015

(87) PCT Pub. No.: WO2014/074549
PCT Pub. Date: May 15, 2014

(65) Prior Publication Data
US 2015/0330554 A1    Nov. 19, 2015

Related U.S. Application Data

(60) Provisional application No. 61/722,875, filed on Nov. 6, 2012.

(51) Int. Cl.
*F16M 1/00* (2006.01)
*C02F 1/44* (2006.01)
*B01D 61/02* (2006.01)
*B01D 61/10* (2006.01)

(52) U.S. Cl.
CPC ............... *F16M 1/00* (2013.01); *B01D 61/025* (2013.01); *B01D 61/10* (2013.01); *C02F 1/441* (2013.01); *B01D 2313/06* (2013.01); *B01D 2313/54* (2013.01); *C02F 2201/007* (2013.01); *Y10T 29/49627* (2015.01)

(58) Field of Classification Search
CPC ..... F16M 1/00; C02F 1/441; C02F 2201/007; B01D 61/025; B01D 61/10; B01D 2313/06; B01D 2313/54; Y10T 29/49627
USPC ........ 206/386, 598; 211/194, 188, 189, 71.01
See application file for complete search history.

(56) References Cited

U.S. PATENT DOCUMENTS

| | | | | |
|---|---|---|---|---|
| 2,632,567 A | * | 3/1953 | Richtmyer | B65G 1/0442 108/53.5 |
| 3,052,440 A | * | 9/1962 | Bauer | B63B 25/24 188/268 |
| 4,175,666 A | * | 11/1979 | Smith | A47B 81/007 211/182 |
| 4,199,070 A | * | 4/1980 | Magnussen, Jr. | A47B 73/006 138/112 |
| 4,391,377 A | * | 7/1983 | Ziaylek, Jr. | A47B 81/007 206/443 |
| 4,768,418 A | * | 9/1988 | Blommer | F42B 39/24 206/3 |
| 5,370,245 A | * | 12/1994 | Tersch | A47B 73/006 211/194 |
| 5,692,625 A | * | 12/1997 | Filipescu | A47B 43/00 211/194 |

(Continued)

*Primary Examiner* — Brent W Herring
(74) *Attorney, Agent, or Firm* — Nancy J. Flint, Esq.; Nancy J. Flint, Attorney At Law, P.A.

(57) ABSTRACT

A modular frame system for support of pressure vessels used in water treatment systems comprising a plurality of frame cells is disclosed, where each frame cell is releasably attachable to other frame cells in a variety of relationships. The frame cells may be attached horizontally, vertically, or side-by-side. The frame cells are designed to accommodate a variety of pressure vessels having different sizes and weights, and having different connections for connection to other pressure vessels.

20 Claims, 10 Drawing Sheets

(56) References Cited

U.S. PATENT DOCUMENTS

| | | | | |
|---|---|---|---|---|
| 5,755,541 A * | 5/1998 | Suarez | B60P 7/12 | 211/59.4 |
| 6,109,190 A * | 8/2000 | Hale | B65D 19/0016 | 108/57.25 |
| 6,279,763 B1 * | 8/2001 | Bush | A47B 43/00 | 108/55.1 |
| 6,464,092 B1 * | 10/2002 | Kortman | A47B 46/00 | 211/162 |
| 6,811,042 B2 * | 11/2004 | Kelly | A47B 87/0207 | 206/509 |
| 7,326,325 B2 * | 2/2008 | Liang | B01D 61/48 | 204/524 |
| 7,997,441 B2 * | 8/2011 | Marcel | B65D 88/128 | 206/386 |
| 8,100,273 B2 * | 1/2012 | Apps | B60P 3/055 | 211/74 |
| 8,210,374 B2 * | 7/2012 | Harpole | B65D 19/12 | 211/194 |
| 8,282,823 B2 * | 10/2012 | Acernese | B01D 61/025 | 210/236 |
| 8,434,631 B2 * | 5/2013 | Harpole | B65D 19/12 | 211/194 |
| 2004/0026346 A1 * | 2/2004 | Kelly | A47B 87/0207 | 211/74 |
| 2010/0252471 A1 * | 10/2010 | Homer | B65D 19/385 | 206/386 |
| 2015/0158566 A1 * | 6/2015 | Doig | B63C 3/06 | 405/7 |
| 2015/0291197 A1 * | 10/2015 | Buttazzoni | B62B 3/00 | 280/79.11 |

* cited by examiner

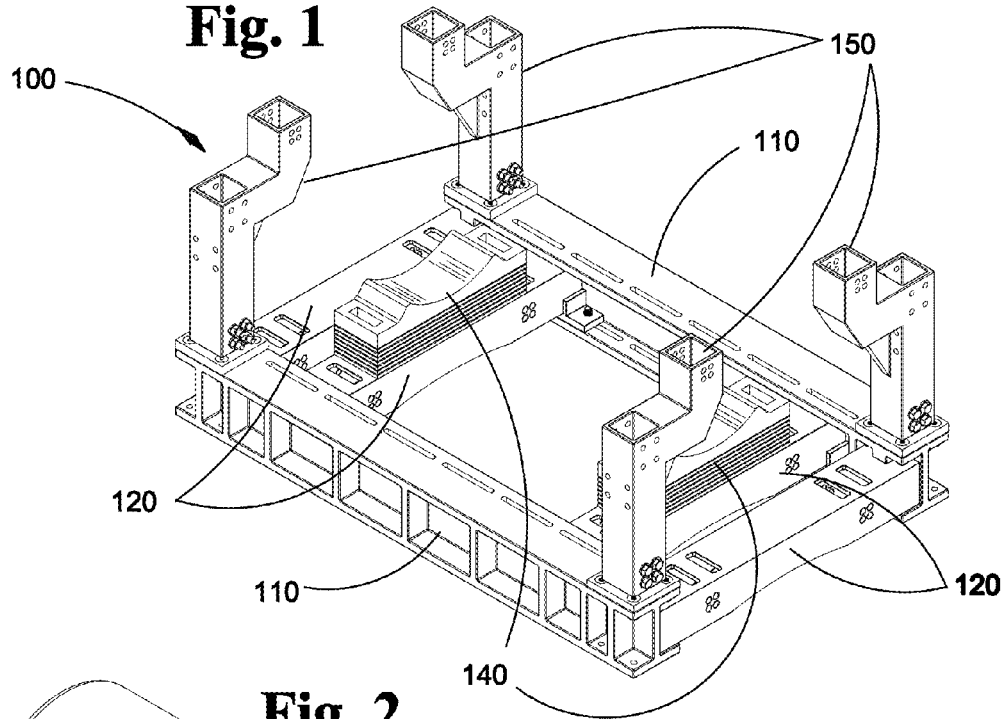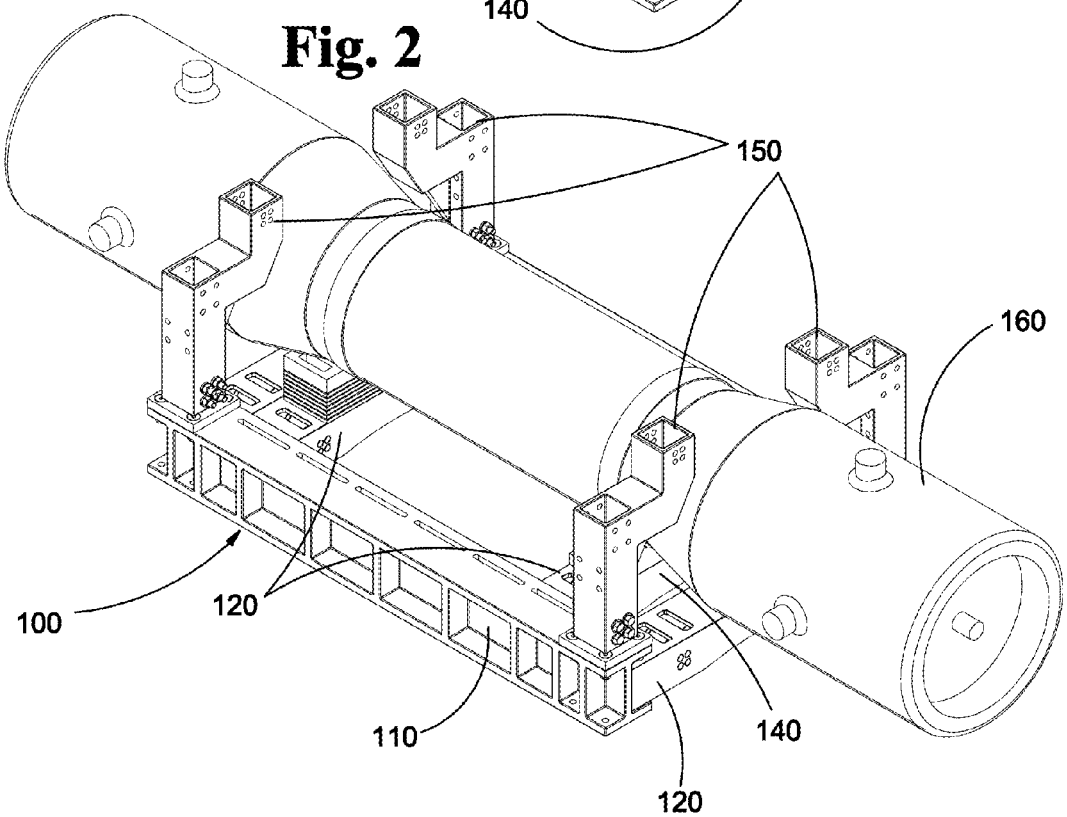

MODULAR FRAME SYSTEM FOR PRESSURE VESSELS USED IN WATER TREATMENT SYSTEMS

RELATED APPLICATION

This application claims the benefit of U.S. Provisional Application No. 61/722,875 filed Nov. 6, 2012, the disclosure of which is incorporated herein in its entirety by reference.

FIELD OF THE INVENTION

The invention relates to a modular frame system for support of pressure vessels used in water treatment systems comprising a plurality of frame cells, where each frame cell is releasably attachable to other frame cells in a variety of relationships. The frame cells may be attached horizontally, vertically, or side-by-side. The frame cells are designed to accommodate a variety of pressure vessels having different sizes and weights, and having different connections for connection to other pressure vessels.

BACKGROUND OF THE INVENTION

Water treatment describes processes used to make water more acceptable for a desired end-use. These can include treatment of water for use as drinking water, or for industrial, medical or other uses. The goal of water treatment is to remove existing contaminants in the water, or to reduce the concentration of such contaminants so the water becomes fit for its desired end-use.

Reverse osmosis (RO) is one method of water treatment. In general, RO is a membrane-technology filtration method that removes many types of large molecules and ions from solutions. Solutions are made up of a solute which is a substance that is dissolved in another substance, called the solvent. By applying pressure to the solution when it is on one side of a selective membrane, the solute is retained on the pressurized side of the membrane and the pure solvent is allowed to pass to the other side of the membrane. The membrane that is used in RO should not allow large molecules or ions through the pores (holes), but should allow smaller components of the solution (such as the solvent) to pass freely.

In the normal osmosis process, the solvent naturally moves from an area of low solute concentration (High Water Potential), through a membrane, to an area of high solute concentration (Low Water Potential). The movement of a pure solvent to equalize solute concentrations on each side of a membrane generates osmotic pressure. Applying an external pressure to reverse the natural flow of pure solvent, thus, is reverse osmosis. The process is similar to other membrane technology applications. However, there are key differences between reverse osmosis and filtration. The predominant removal mechanism in membrane filtration is straining, or size exclusion, so the process can theoretically achieve perfect exclusion of particles regardless of operational parameters such as influent pressure and concentration. Reverse osmosis, however, involves a diffusive mechanism so that separation efficiency is dependent on solute concentration, pressure, and water flux rate.

Other water treatment processes that utilize membrane technology for filtration are nano filtration, and ultrafiltration. These technologies also utilize membrane technology but the membrane has a smaller nominal pore size.

Industrial and commercial reverse osmosis water treatment systems are widely available. All systems treat the water in pressure vessels, where the size and construction of the pressure vessels vary according to capacity (throughput) of the system and the design of the pressure vessel by the specific manufacturer. Thus, a commercial or industrial reverse osmosis system may be made up of a plurality of pressure vessels which may be connected lengthwise or horizontally. This requires that adjacent vessels be connected to each other. The fittings for connecting adjacent pressure vessels vary according to manufacturer. Additionally, the pressure vessels can be 4-31 feet in length and weigh several hundred pounds apiece.

Reverse osmosis water treatment systems will be designed differently based on the specifications needed for an application and the physical plant design. Accordingly, the plurality of pressure vessels will be connected in varying arrangements. Typically, a frame must be custom built for each system. This is costly as the frame is custom built for a particular system, and economies of scale cannot be achieved.

U.S. Pat. No. 8,282,823 to Acernese et al. and titled LIGHTWEIGHT MODULAR WATER PURIFICATION SYSTEM WITH RECONFIGURABLE PUMP POWER OPTIONS, the contents of which are incorporated in their entirety by reference, discloses a modular water purification system using a pump component that is mountable by standardized fittings into alternative prime mover modules that can receive and power the pump. The pump can be interchangeably mounted on an internal combustion engine module or an electric motor module. The pump is enclosed and protected by a frame with end plates, elongated bar handles and a standardized base that fits into and is fixed by a sliding flange and clamping structure, locating the pump precisely to engage a rotational fitting on the pump shaft with a complementary fitting coupled to the prime mover.

U.S. Pat. No. 7,326,325 to Liang et al. and titled APPARATUS AND METHOD FOR CONNECTING WATER TREATMENT DEVICES, the contents of which are incorporated in their entirety by reference, discloses a method and apparatus for associating water treatment modules. A bracket may be used to provide support for one or more water treatment modules. The bracket may be permanently or removably attached to a module or housing or may simply support the module or housing without being attached to it. A bracket may be constructed and arranged to mate or join with another bracket that may be different or similar or identical to the first bracket. By joining two or more brackets together, different modules may be associated with each bracket, and the modules may be immobilized with respect to each other.

U.S. Pat. No. 6,811,042 to Kelly et al. and titled MODULAR RACK, the contents of which are incorporated in their entirety by reference, discloses a stackable storage unit may be vertically stacked for storage and transportation of storable members. The storage unit comprises at least one pair of rails extending in a first direction and having a contoured surface for supporting a surface area of a generally cylindrical storable member. At least two generally vertical walls extend in the first direction on opposing ends of the storage unit. The walls comprise a flat top surface with a plurality of alignment openings therein. A plurality of alignment tongues extending from the bottom of the wall are positioned and configured to engage corresponding alignment openings in an underlying storage unit. A rib structure underlies the rails and connects the walls to the rails. Feet extend below the bottom of the alignment tongues and support the storage unit on a generally flat surface or fit inside the walls of an underlying storage unit.

U.S. Pat. No. 4,199,070 to Magnussen, Jr. and titled MODULAR RACK, the contents of which are incorporated in their entirety by reference, discloses a modular component of a rack for storing articles comprising: (a) a longitudinally elongated body having opposite sides, a longitudinally elongated boundary, longitudinally spaced segmented boundaries laterally spaced from the longitudinally elongated boundary, and longitudinally spaced laterally extending boundaries at longitudinally opposite ends of the body, (b) the body having tongue and groove connections at certain of the boundaries, the connections defining guide shoulders extending widthwise between said opposite sides for guided connection with like tongue and groove connections on a like modular component, (c) and the body defining through openings extending widthwise between said sides, those openings sized to receive said articles which are elongated in said widthwise direction, the through openings being longitudinally spaced between the laterally extending boundaries, the openings located generally between the segmented boundaries, and the openings having longitudinally and laterally extending sides.

SUMMARY OF THE INVENTION

In one embodiment, the modular frame system for pressure vessels used in water treatment systems comprises a plurality of frame cells, where each frame cell is releasably attachable to other frame cells in a variety of relationships, for example, horizontally, vertically, or side-by-side. Further, the frame cells may be attached to multiple other cells in horizontal, vertical and side-by-side configurations, and combinations thereof.

The frame cells are designed to accommodate a variety of pressure vessels having different sizes and weights, and having different connections for connecting to other pressure vessels.

The frame cells can be made of any material such as non-metallic composite materials, such as polymers that will not rust and are lighter weight than metallic cells.

In one embodiment, each frame cell comprises two parallel lengthwise arms, or I beams. Each frame cell further comprises two or more support beams disposed between the I beams. One or more of the support beams comprises a saddle disposed substantially in the center of each support beam. The saddle is configured to cradle pressure vessels. The saddle is further configured to be height adjustable such that the height of the pressure vessel can be adjusted to accommodate fittings to other pressure vessels and to align pressure vessel ports.

Each frame cell further comprises four (4) upright support columns, one disposed at each corner of the frame cell and extending vertically comprising a vertical column attached to and rising from the frame cell, with an arm at the top end extending horizontally at a right angle inwardly toward the opposite side of the frame cell, with a vertical riser arising from the end of each arm. The vertical riser of each upright support column is configured to releasably attach to the bottom of another frame cell to allow for vertical attachment of frame cells to form a modular frame system.

In one embodiment, the modular frame system for pressure vessels used in water treatment systems further comprises one or more base cells each comprising two parallel I beams and a plurality of support beams to form a quadrilateral-shaped base.

All of the cells—both the frame cells and the base cells—may be configured to releasably attach in horizontal, vertical and side-by-side configurations, and combinations thereof. The base cells can be used to support the frame cells that support the pressure vessels and also to support other machinery or parts of the water treatment system such as high pressure pumps, energy recovery devices, variable frequency drives, multimedia filters, cartridge filters, and control panels.

DESCRIPTION OF THE DRAWINGS

The invention will be described with reference to the accompanying drawings, in which like elements are referenced with like numerals.

FIG. 1 is a side perspective view of a first embodiment of a single frame cell for supporting a pressure vessel of a water treatment system according to one embodiment of the invention.

FIG. 2 is a side perspective view of the single frame cell of FIG. 1 and further showing a pressure vessel placed inside the cavity.

DETAILED DESCRIPTION OF THE INVENTION

Figure 3:
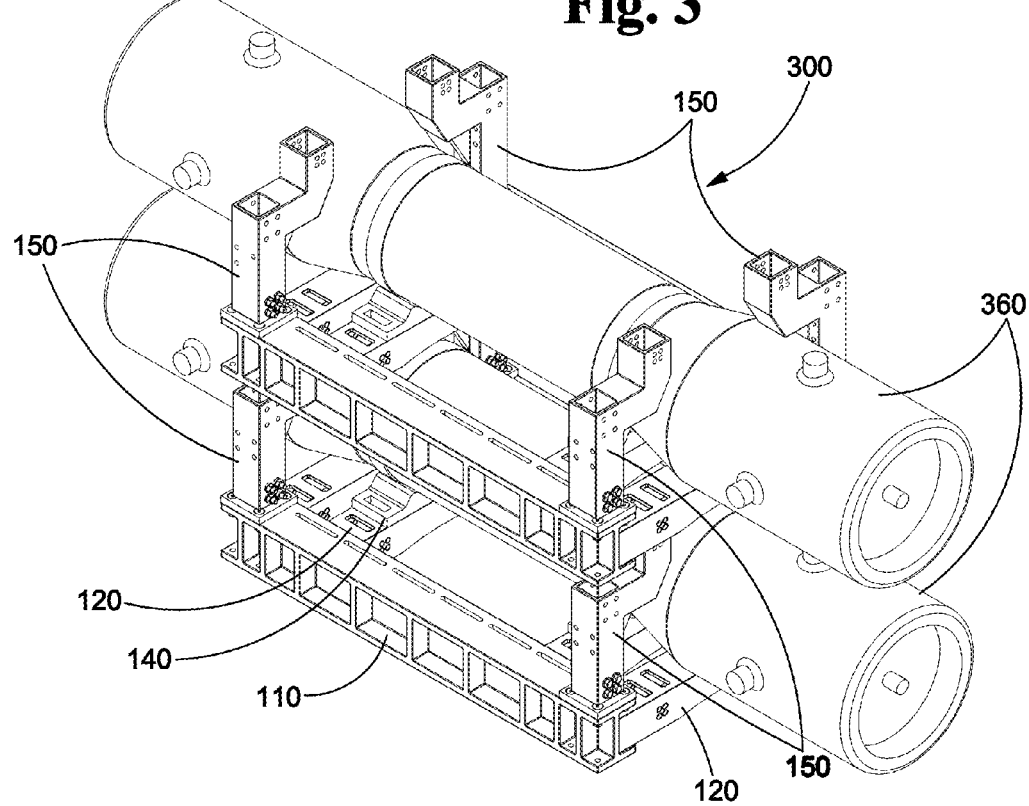
FIG. 3 is a side perspective view of a modular frame system comprising two single frame cells as seen in FIG. 1 stacked vertically and further showing a pressure vessel placed inside each of the cavities.

The invention relates to a modular frame system for support of pressure vessels used in water treatment systems comprising a plurality of frame cells, where each frame cell is releasably attachable to other frame cells in a variety of relationships. The frame cells may be attached horizontally, vertically, or side-by-side. The frame cells are designed to accommodate a variety of pressure vessels having different sizes and weights, and having different connections for connection to other pressure vessels.

In one embodiment, the modular frame system for pressure vessels used in water treatment systems comprises a plurality of frame cells, where each frame cell is releasably attachable to other frame cells in a variety of relationships. For example, the frame cells may be attached horizontally, vertically, or side-by-side. Further, the frame cells may be attached to multiple other cells in horizontal, vertical and side-by-side configurations, and combinations thereof.

The frame cells are designed to accommodate a variety of pressure vessels having different sizes and weights, and having different connections for connecting to other pressure vessels.

The frame cells can be made of any material. In one embodiment, the frame cells are manufactured from non-metallic composite materials, such as polymers, that will not rust and are lighter weight than metallic cells. Suitable composite materials include fiber reinforced polymers, glass reinforced polymers and carbon reinforced plastics. In one embodiment, resins such as acetal resins can be used to manufacture the frame cells. A suitable acetal resin is Delrin® 2700

NC010 Low Viscosity Acetal Copolymer, available from DuPont. Frame cells manufactured from non-metallic composite materials may have metallic fittings to connect to other cells or base plates.

In one embodiment, each frame cell comprises two parallel lengthwise arms, or I beams. Each frame cell further comprises two or more support beams disposed between the I beams. One or more of the support beams comprises a saddle disposed substantially in the center of each support beam. The saddle is configured to cradle pressure vessels. The saddle is further configured to be height adjustable such that the height of the pressure vessel can be adjusted to accommodate fittings to other pressure vessels. In one embodiment, a plurality of plates may be disposed between the saddle and the support beam to increase the height of the saddle in accommodation of various sizes of pressure vessels.

Each frame cell further comprises four (4) upright support columns, one disposed at each corner of the frame cell and extending vertically. A support column is attached at the base to each corner. Each support column comprises a vertical column attached to and rising from the frame cell, with an arm at the top end extending horizontally at a right angle inwardly toward the opposite side of the frame cell, with a vertical riser arising from the end of each arm. The four support columns thus form a cavity in which a pressure vessel can be placed. The distance that the arms extend horizontally can be determined by the manufacturer. The vertical riser of each upright support column is configured to releasably attach to the bottom of another frame cell to allow for vertical attachment of frame cells to form a modular frame system.

In one embodiment, the I beams comprise a plurality of holes configured to accept an attachment mechanism, such as a screw or a bolt. The screw or bolt may be made of metal, such as stainless steel or zinc. Similarly, each of the support beams comprises a plurality of holes configured to accept an attachment mechanism. Additionally, a plurality of shims may be provided that are configured to accept the ends of each of the support beams and which comprises a plurality of holes configured to accept an attachment mechanism.

A plurality of support columns are each configured to mate with and accept internally an adapter, which adapter comprises a plate having a plurality of holes configured to accept the attachment mechanisms and a vertical height member sized to fit into the interior of the support columns. The vertical column of each support column and the vertical height member of each adapter further comprise a plurality of holes that align and accept attachment mechanisms to mate the adapters with the support columns. The height of the vertical height member of each adapter can vary according to the design of the modular frame system.

Each of the I beams, the support beams, the shims, the support columns and the adapters may be made out of a composite material or a plastic, such as a resin, for example acetal resin.

Finally, a plurality of saddles is provided which are configured with a plurality of holes configured to accept an attachment mechanism. The saddles may be made out of a deformable material, such as rubber.

To form the frame cell, the user can determine how many support beams to use in the frame cell. The ends of each support beam are aligned with the I beams such that the holes that accept the attachment mechanisms mate, and attachment mechanisms can be inserted through the mated holes. Four adapters can be aligned at each of the ends of each of the I beams such that the holes that accept the attachment mechanisms mate, and attachment mechanisms can be inserted through the mated holes.

Two or more saddles can be attached to the support beams where desired by the user, and the height of each of the saddles can be adjusted as needed to align pressure vessel ports.

A closure mechanism, such as a hex nut, can be placed on the end of each attachment mechanism for security. Washers may be used as well. Further attachment mechanisms may be used as well to further stabilize the frame cell.

In one embodiment, the modular frame system for pressure vessels used in water treatment systems further comprises one or more base cells. The base cells comprise two parallel I beams and a plurality of support beams to form a quadrilateral-shaped base. The base cells can be configured from the same components as the frame cells.

All of the cells—both the frame cells and the base cells—may be configured to releasably attach in horizontal, vertical and side-by-side configurations, and combinations thereof. The base cells can be used to support the frame cells that support the pressure vessels and also to support other machinery or parts of the water treatment system such as high pressure pumps, energy recovery devices, variable frequency drives, multimedia filters, cartridge filters, and control panels.

Turning to the figures, FIG. 1 is a side perspective view of a first embodiment of a single frame cell 100 for supporting a pressure vessel of a water treatment system, showing I beams 110; support beams 120; saddles 140; and support columns 150.

FIG. 2 is a side perspective view of the single frame cell 100 of FIG. 1 and further showing a pressure vessel 160 placed inside the cavity formed by I beams 110, support beams 120 and support columns 150.

FIG. 3 is a side perspective view of a modular frame system 300 comprising two single frame cells as seen in FIG. 1 stacked vertically and further showing a pressure vessel 360 placed inside each of the cavities formed by I beams 110, support beams 120 and support columns 150 of each frame cell 100.

Figure 4:
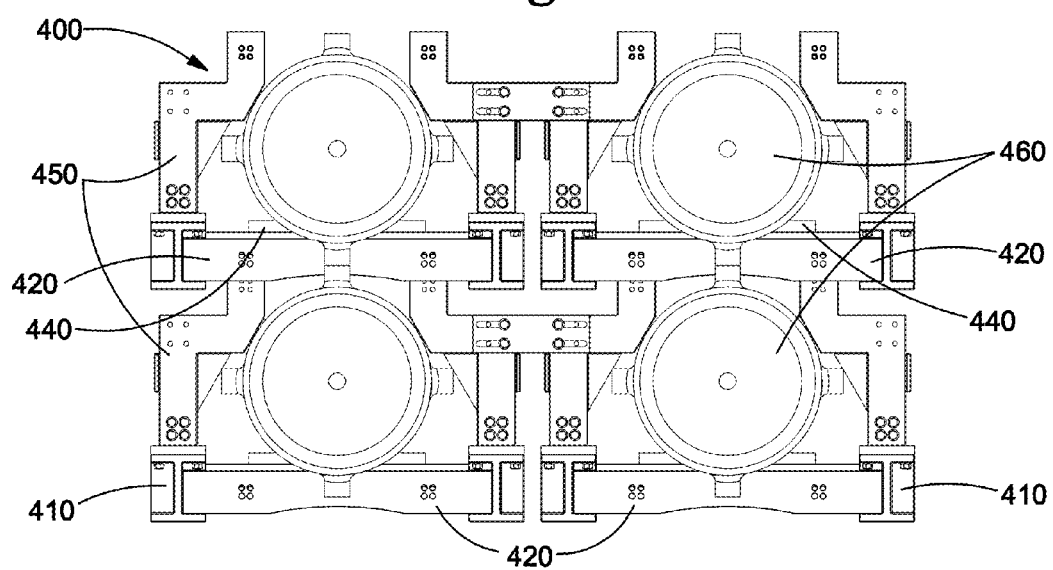
FIG. 4 is a front view of a modular frame system comprising four single frame cells as seen in FIG. 1 stacked vertically and attached horizontally further showing a pressure vessel placed inside each of the cavities.

FIG. 4 is a front view of a modular frame system 400 comprising four single frame cells as seen in FIG. 1 stacked vertically and attached horizontally further showing a pressure vessel 460 placed inside each of the cavities formed by I beams 110, support beams 120 and the support columns 150 of each frame cell 100.

Figure 5:
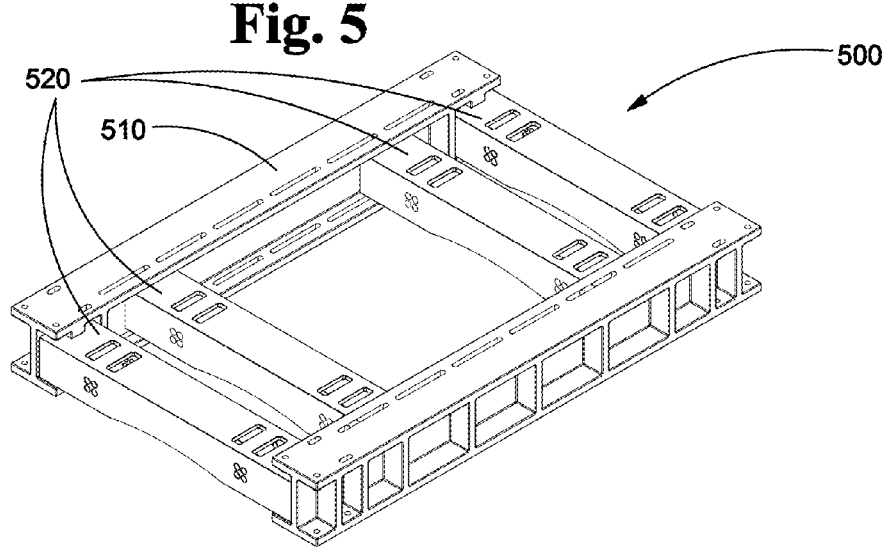
FIG. 5 is a top view of a single base cell.

FIG. 5 is a top view of a single base cell 500, showing I beams 510 and support beams 520.

Figure 6:
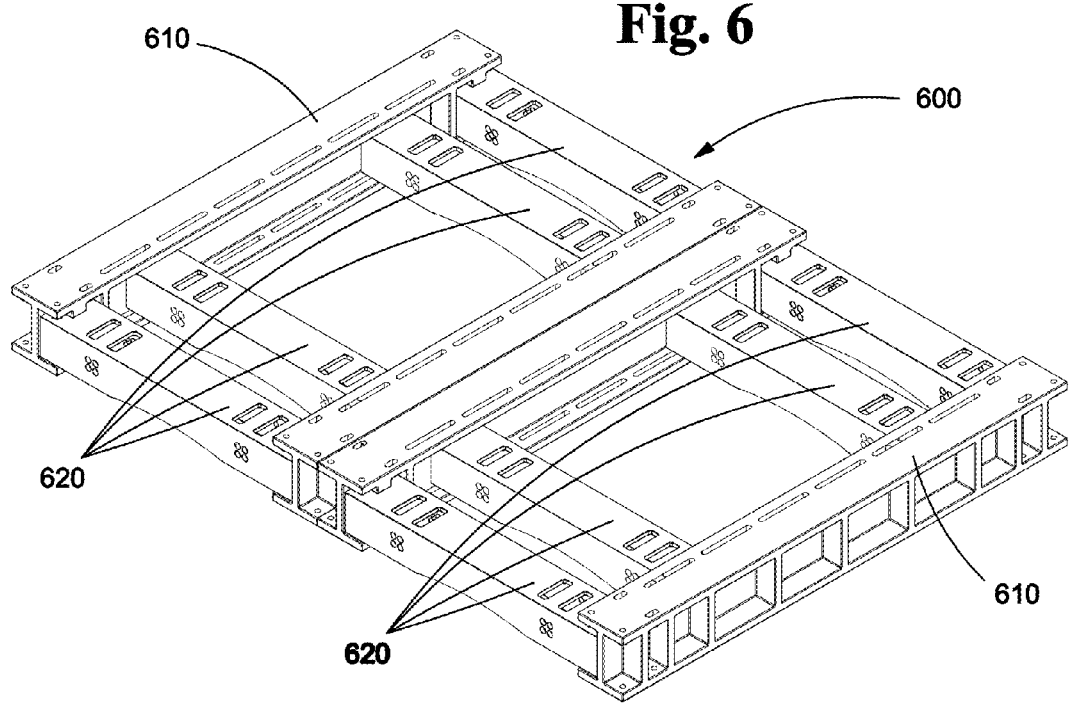
FIG. 6 is a top view of two single base cells as seen in FIG. 5 attached horizontally.

FIG. 6 is a top view of two single base cells 500 as seen in FIG. 5 attached horizontally, showing I beams 510 and support beams 520 of each single base cell 500.

Figure 7:
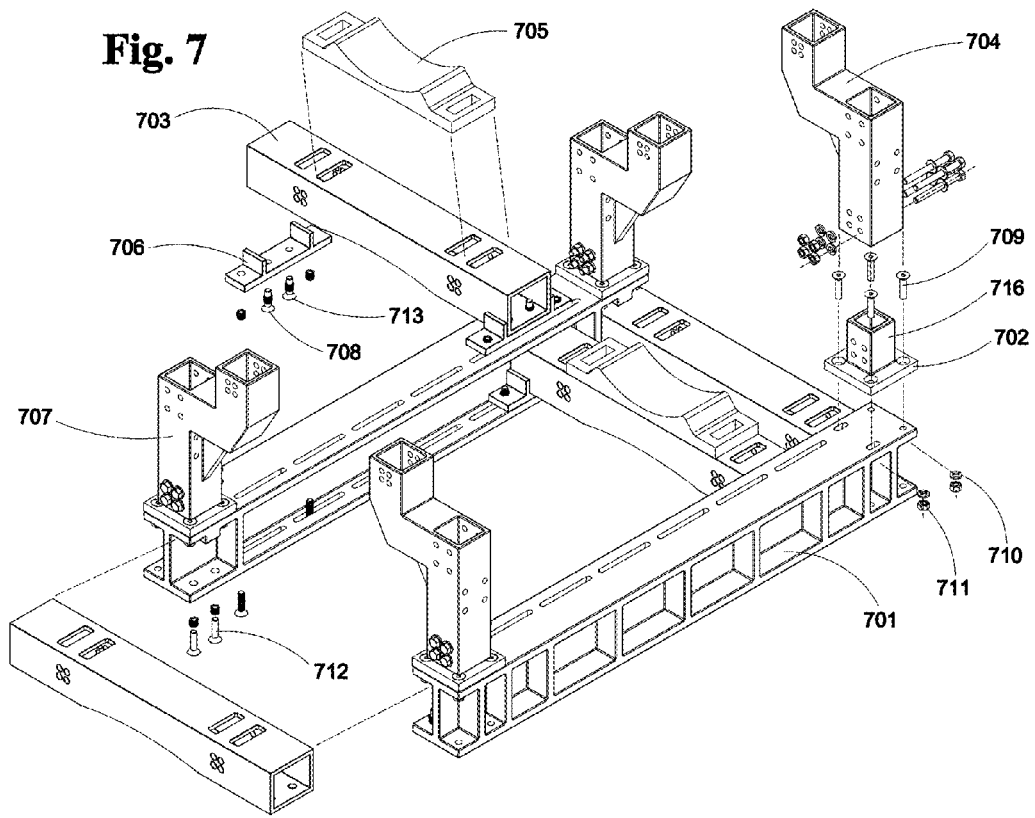
FIG. 7 is an exploded view of the single frame cell of FIG. 1.

FIG. 7 is an exploded view of the single frame cell of FIG. 1 showing I beams 701; adapters 702; support beams 703; vertical risers 704; saddles 705; shims 706; support columns 707; attachment mechanisms 708, 709 and 712; lock washers 710; and hex nuts 711. Adapters 702 include vertical height member 716.

Figure 8:
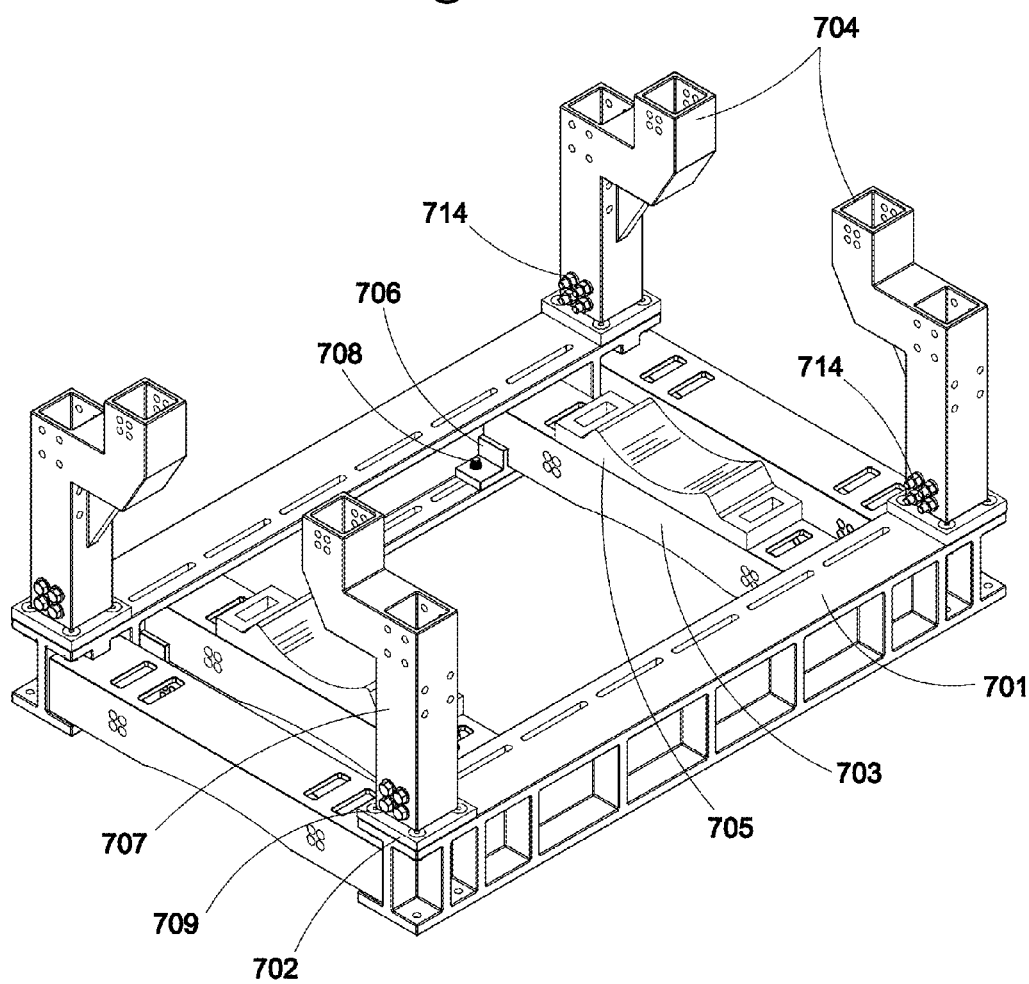
FIG. 8 is an assembled view of the single frame cell of FIG. 1.

FIG. 8 is an assembled view of the single frame cell of FIG. 1 showing I beams 701; adapters 702; support beams 703; vertical risers 704; saddles 705; shims 706; and support columns 707. Further shown are attachment mechanisms 709 that attach adapters 702 to I beams 701; attachment mechanisms 708 that attach shims 706 to support beams 703 and I beams 701; and attachment mechanisms 714 that attach adaptors 702 to support columns 707.

Figure 9:
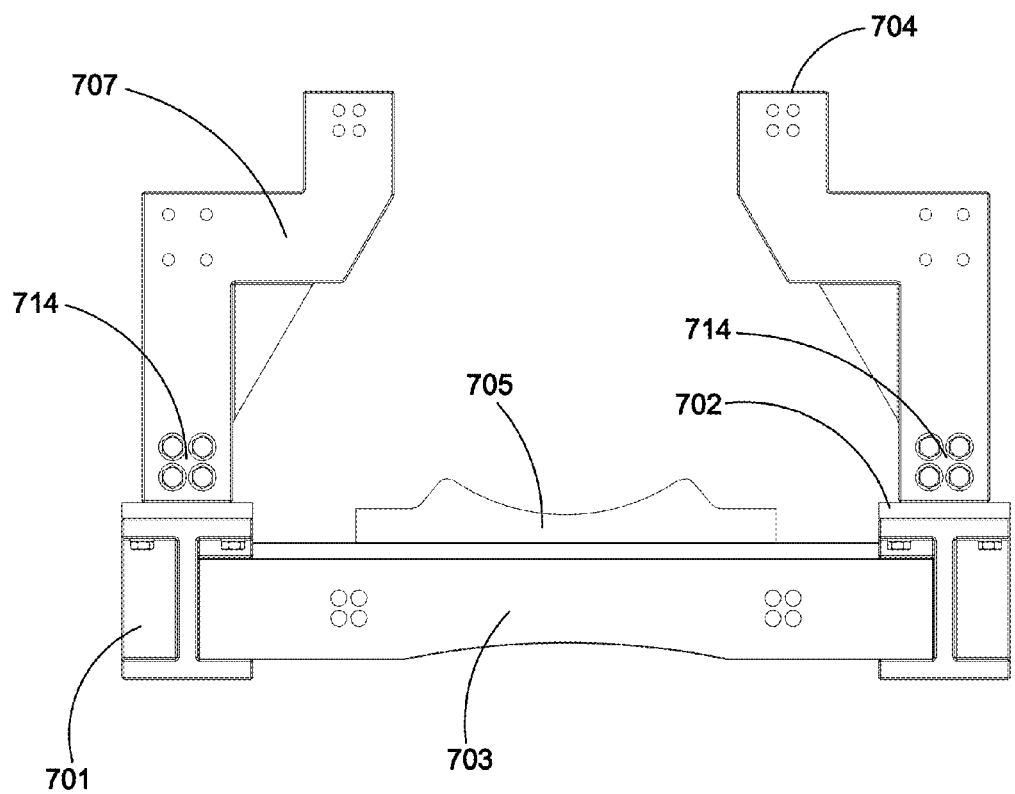
FIG. 9 is an end view of the single frame cell of FIG. 1.

FIG. 9 is an end view of the single frame cell of FIG. 1 showing I beams 701; adapters 702; support beams 703; vertical risers 704; saddles 705; and support columns 707. Further shown are attachment mechanisms 714 that attach adaptors 702 to support columns 707.

Figure 10:
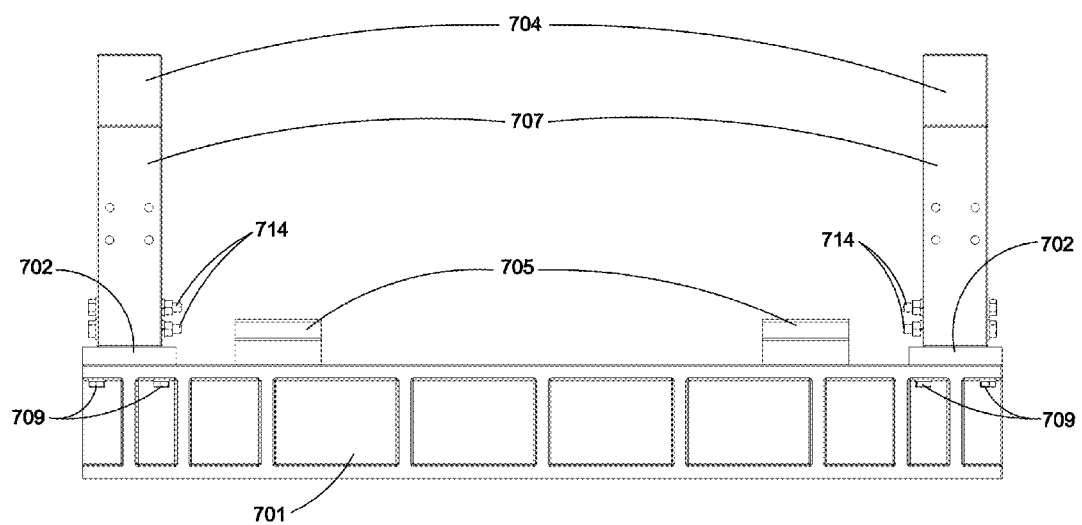
FIG. 10 is a side view of the single frame cell of FIG. 1.

FIG. 10 is a side view of the single frame cell of FIG. 1 showing I beams 701; vertical risers 704; saddles 705; and support columns 707. Further shown are attachment mechanisms 709 that attach adapters 702 to I beams 701; and attachment mechanisms 714 that attach adaptors 702 to support columns 707.

Figure 11:
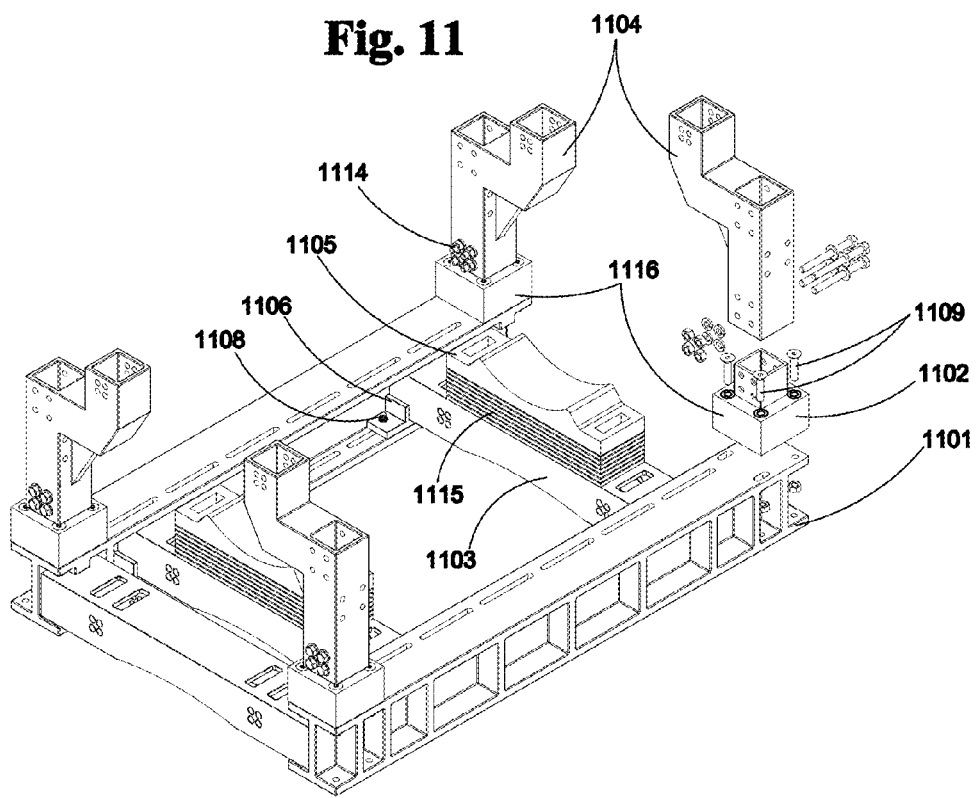
FIG. 11 is a semi-exploded view of a second embodiment of a single frame cell.

FIG. 11 is a semi-exploded view of a second embodiment of a single frame cell showing I beams 1101; adapters 1102; support beams 1103; vertical risers 1104; saddles 1105; shims 1106; and support columns 1107. In this embodiment, vertical height members 1116 of adapters 1102 are taller than vertical height members 716 of adapters 702 shown in the embodiment of FIG. 7. Further shown are attachment mechanisms 1109 that attach adapters 1102 to I beams 1101; attachment mechanisms 1108 that attach shims 1106 to support beams 1103 and I beams 1101; and attachment mechanisms 1114 that attach adaptors 1102 to support columns 1107. Also shown are plates 1115 disposed between support beams 1103 and saddles 1105 that adjust the height of saddles 1105 in accommodation of various sizes of pressure vessels.

Figure 12:
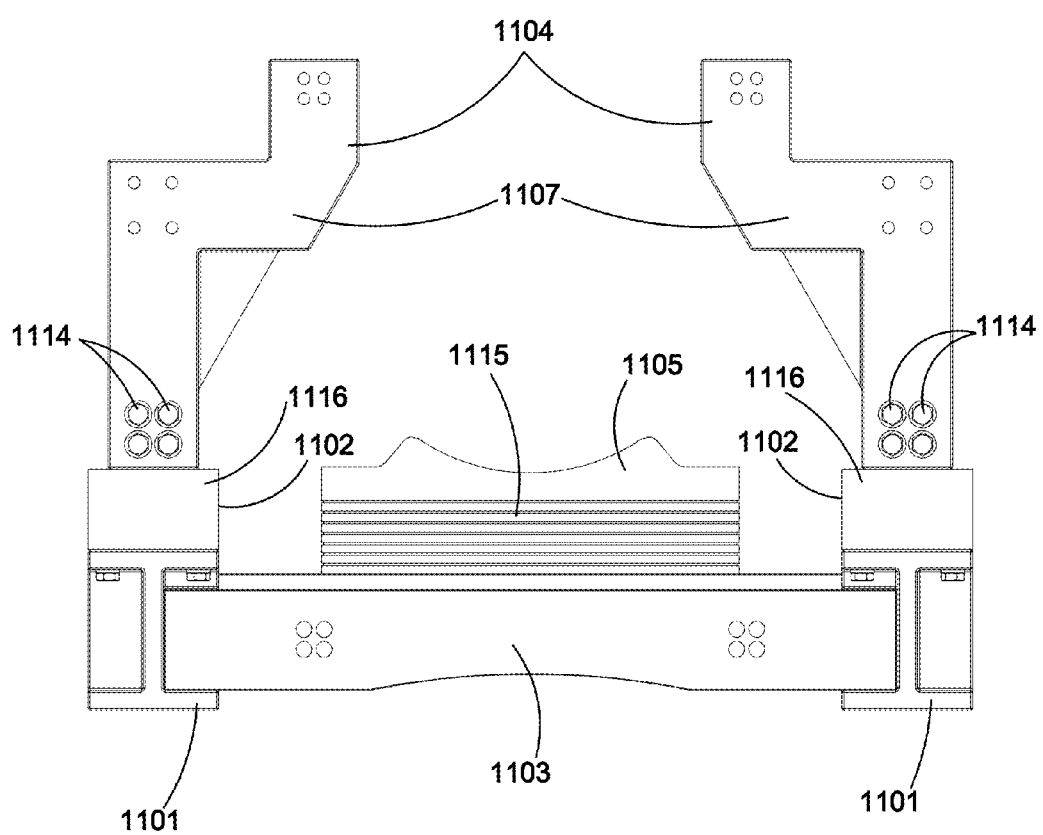
FIG. 12 is a side view of the single frame cell of FIG. 11.

FIG. 12 is a side view of the single frame cell of FIG. 11 showing I beams 1101; adapters 1102; support beams 1103; vertical risers 1104; saddles 1105 support columns 1107; and vertical height members 1116 of adapters 1102. Further shown are attachment mechanisms 1114 that attach adaptors 1102 to support columns 1107. Also shown are plates 1115 disposed between support beams 1103 and saddles 1105 that adjust the height of saddles 1105 in accommodation of various sizes of pressure vessels.

Figure 13A:
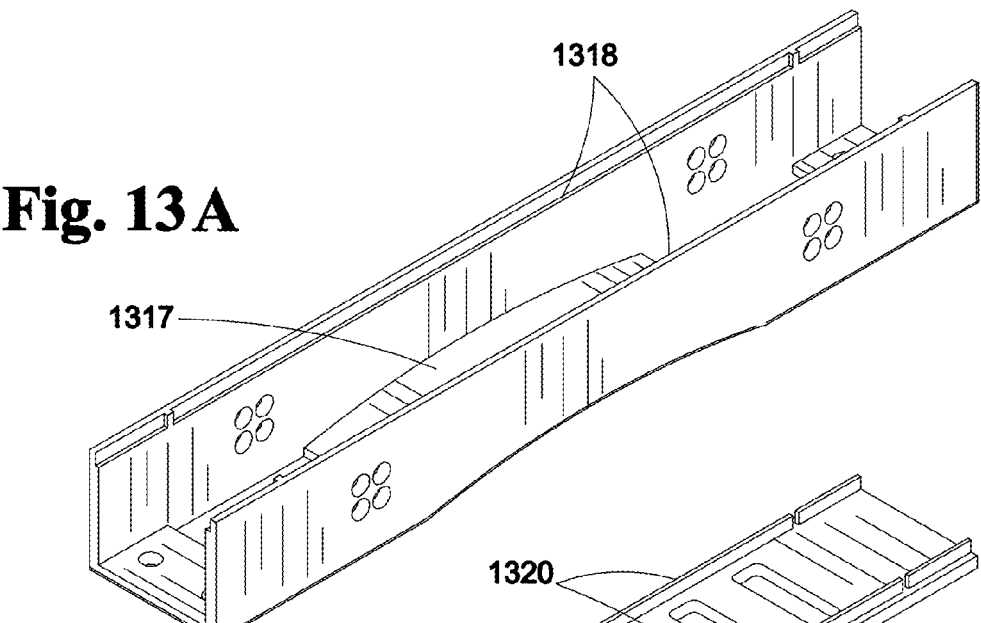
FIG. 13A-13C depict an alternative embodiment of support beams as used in the modular frame system of the invention.
Figure 13B:
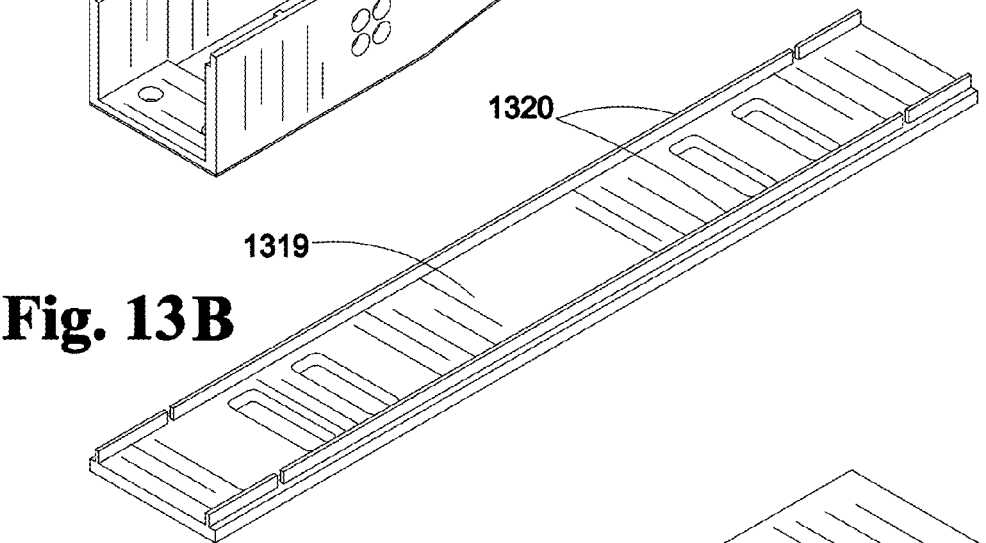
Figure 13C:
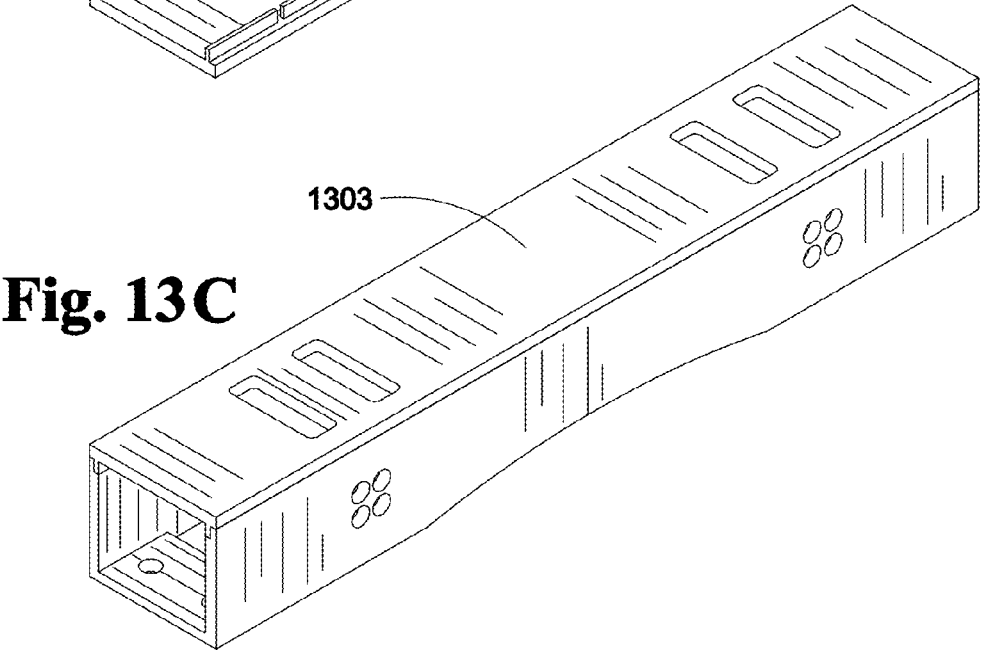

FIGS. 13A-13C depict an alternative embodiment of support beams 1303 as used in the modular frame system of the invention. In FIG. 13A, support beam base unit 1317 is depicted. Support beam base unit 1317 comprises shoulders 1318 disposed along the top in the longitudinal direction. In FIG. 13B, support beam top cover 1319 is depicted. Support beam top cover 1319 comprises extensions 1320 disposed in the longitudinal direction. Support beam top cover 1319 can comprises various thicknesses to accommodate varying sizes of pressure vessels. As shown in FIG. 13C, extensions 1320 of support beam top cover 1319 mate with shoulders 1318 of support beam top cover 1317 to form support beam 1303. Support beam 1303 can be used in place of support beam 703 or support beam 1103, or any other support beam in other embodiments of the modular frame system of the invention.

The foregoing embodiments have been presented for the purpose of illustration and description only and are not to be construed as limiting the scope of the invention in any way.

What is claimed is:

1. A modular frame system for supporting a plurality of vessels, comprising:
    a plurality of frame cells, each frame cell comprising:
        two lengthwise arms each comprising a proximal end and a distal end, each further comprising a top surface, a bottom surface and an outer side surface, wherein the top surface, bottom surface and outer side surface of each lengthwise arm forms a cavity within the lengthwise arm;
        two or more support beams releasably attached to each of the lengthwise arms, wherein the support beams are substantially the same length such as to dispose the two lengthwise arms in a parallel configuration, wherein the two lengthwise arms and two of the support beams, when attached, form a base of the frame cell; and
        four upright support columns each having a hollow interior, wherein each upright support column comprises a vertical column attached to and rising from a separate corner of the base of the frame cell, an arm at the top end of the vertical column extending horizontally at a right angle inwardly toward the opposite lengthwise arm to which the upright support column is attached and a vertical riser extending vertically from the end of each arm,
    wherein the four support columns, the two lengthwise arms and the two or more support beams form a cavity in which a vessel can be placed,
    wherein one or more of the support beams comprises a saddle disposed substantially in the center of the support beam, wherein the saddle is configured to cradle the vessel,
    wherein a plurality of frame cells are attached to form a modular frame system for supporting a plurality of vessels.

2. The modular frame system of claim 1, wherein the vessel comprises a pressure vessel for use in a water treatment system.

3. The modular frame system of claim 2, wherein each saddle is height adjustable to accommodate the height of the vessel and to accommodate fittings of vessels in adjacent frame cells.

4. The modular frame system of claim 3, wherein the height of the saddle is adjusted by disposing one or more plates between the bottom of the saddle and the top of the support beam on which the saddle is disposed.

5. The modular frame system of claim 2, wherein the vertical riser of each upright support column is configured to releasably attach to the bottom of an adjacent frame cell to form the modular frame system.

6. The modular frame system of claim 2, wherein one or more support beams comprises a top cover and a U-shaped base, wherein the top cover is releasably attached to the U-shaped base.

7. The modular frame system of claim 2, further comprising a plurality of adapters releasably attached to the top surface of each corner of the base of each frame cell, wherein each adapter is sized to fit inside the hollow interior of an upright support column, wherein each upright support column is attached to an adapter.

8. The modular frame system of claim 7, wherein the height of each adapter is configured according to the size of the vessel.

9. The modular frame system of claim 2, wherein the lengthwise arms, the support beams, and the upright support columns comprise a composite material or a plastic.

10. The modular frame system of claim 9, wherein the composite material comprises plastic.

11. The modular frame system of claim 10, wherein the plastic comprises a resin.

12. The modular frame system of claim 11, wherein the resin comprises acetal resin.

13. The modular frame system of claim 9, wherein the saddles comprise a deformable material.

14. The modular frame system of claim 13, wherein the deformable material comprises rubber.

15. A method of supporting a plurality of vessels, comprising:
    determining the length, width and height of each of a plurality of vessels;
    determining the configuration of the plurality of vessels;
    designing a modular frame system to accommodate the plurality of vessels in the determined configuration; and
    building a modular frame system to accommodate the plurality of vessels in the determined configuration, wherein the modular frame system comprises a plurality of frame cells attached to each other in the determined configuration, each frame cell comprising:
two lengthwise arms each comprising a proximal end and a distal end, each further comprising a top surface, a bottom surface and an outer side surface, wherein the top surface, bottom surface and outer side surface of each lengthwise arm forms a cavity within the lengthwise arm;
two or more support beams releasably attached to each of the lengthwise arms, wherein the support beams are substantially the same length such as to dispose the two lengthwise arms in a parallel configuration, wherein the two lengthwise arms and two of the support beams, when attached, form a base of the frame cell;
four upright support columns each having a hollow interior, wherein each upright support column comprises a vertical column attached to and rising from a separate corner of the base of the frame cell, an arm at the top end of the vertical column extending horizontally at a right angle inwardly toward the opposite lengthwise arm to which the upright support column is attached and a vertical riser extending vertically from the end of each arm; and
a plurality of adapters releasably attached to the top surface of each corner of the base of each frame cell, wherein each adapter is sized to fit inside the hollow interior of an upright support column, wherein each upright support column is attached to an adapter,
wherein the four support columns, the two lengthwise arms and the two or more support beams form a cavity in which each vessel can be placed,
wherein one or more of the support beams comprises a saddle disposed substantially in the center of the support beam, wherein the saddle is configured to cradle each vessel, wherein each saddle is height adjustable to accommodate the height of the vessel and to accommodate fittings of vessels in adjacent frame cells.

16. The method of claim 15, wherein each vessel comprises a pressure vessel for use in a water treatment system.

17. The method of claim 16, wherein one or more support beams comprises a top cover and a U-shaped base, wherein the top cover is releasably attached to the U-shaped base.

18. The method of claim 16, wherein the lengthwise arms, the support beams, and the upright support columns comprise plastic.

19. The method of claim 18, wherein the plastic comprises acetal resin.

20. The method of claim 16, wherein the saddles comprise a deformable material.

* * * * *